US007135126B2

(12) United States Patent
Hartley et al.

(10) Patent No.: US 7,135,126 B2
(45) Date of Patent: *Nov. 14, 2006

(54) DEICING FORMULATION HAVING IMPROVED STICKINESS

(75) Inventors: Robert A Hartley, Ontario (CA); David H. Wood, Rome, NY (US)

(73) Assignee: Sears Petroleum & Transport Corp. and Sears Ecological Applications Co., LLC, Rome, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/951,967

(22) Filed: Sep. 28, 2004

(65) Prior Publication Data

US 2005/0062014 A1     Mar. 24, 2005

Related U.S. Application Data

(63) Continuation-in-part of application No. 10/444,559, filed on May 23, 2003, now Pat. No. 6,827,873, which is a continuation of application No. 10/260,808, filed on Sep. 30, 2002, now Pat. No. 6,582,622, which is a continuation-in-part of application No. 10/212,319, filed on Aug. 5, 2002, now Pat. No. 6,596,188, and a continuation-in-part of application No. 10/212,318, filed on Aug. 5, 2002, now Pat. No. 6,599,440, said application No. 10/212,319 is a continuation-in-part of application No. 09/971,163, filed on Oct. 4, 2001, now Pat. No. 6,440,325, and a continuation-in-part of application No. 09/971,165, filed on Oct. 4, 2001, now Pat. No. 6,436,310, said application No. 10/212,318 is a continuation-in-part of application No. 09/971,163, and a continuation-in-part of application No. 09/971,165, filed on Oct. 4, 2001, now Pat. No. 6,436,310, said application No. 09/971,163 is a continuation-in-part of application No. 09/755,587, filed on Jan. 5, 2001, now Pat. No. 6,299,793, said application No. 09/971,165 is a continuation-in-part of application No. 09/755,587, filed on Jan. 5, 2001, now Pat. No. 6,299,793, which is a continuation-in-part of application No. 09/224,906, filed on Jan. 4, 1999, now abandoned.

(60) Provisional application No. 60/070,636, filed on Jan. 7, 1998.

(51) Int. Cl.
    *C09K 3/18*     (2006.01)

(52) U.S. Cl. .......................................... 252/70; 106/13
(58) Field of Classification Search ................. 106/13; 252/70
    See application file for complete search history.

(56) References Cited

U.S. PATENT DOCUMENTS

| | | |
|---|---|---|
| 1,776,181 A | 9/1930 | Collins |
| 4,668,416 A | 5/1987 | Neal |
| 4,676,918 A | 6/1987 | Toth et al. |
| 4,746,449 A | 5/1988 | Peel |
| 4,824,588 A | 4/1989 | Lin |
| 5,135,674 A | 8/1992 | Kuhajek et al. |
| 5,635,101 A | 6/1997 | Janke et al. |
| 5,639,319 A | 6/1997 | Daly |
| 5,709,813 A | 1/1998 | Janke et al. |
| 5,772,912 A | 6/1998 | Lockyer et al. |
| 5,817,252 A | 10/1998 | Hu et al. |
| 5,922,240 A | 7/1999 | Johnson et al. |
| 5,932,135 A | 8/1999 | Janke et al. |
| 6,080,330 A | 6/2000 | Bloomer |
| 6,149,834 A | 11/2000 | Gall et al. |
| 6,231,768 B1 * | 5/2001 | Barham et al. ............. 210/698 |
| 6,299,793 B1 | 10/2001 | Hartley et al. |
| 6,398,979 B1 | 6/2002 | Koefod et al. |
| 6,416,684 B1 | 7/2002 | Bloomer |
| 6,436,310 B1 | 8/2002 | Hartley et al. |
| 6,440,325 B1 | 8/2002 | Hartley et al. |
| 6,468,442 B1 | 10/2002 | Bytnar |
| 6,582,622 B1 * | 6/2003 | Hartley et al. ................. 252/70 |
| 6,596,188 B1 * | 7/2003 | Hartley et al. ................. 252/70 |
| 6,599,440 B1 * | 7/2003 | Hartley et al. ................. 252/70 |
| 6,770,217 B1 * | 8/2004 | Hartley et al. ................. 252/70 |
| 6,805,811 B1 * | 10/2004 | Hartley et al. ................. 252/70 |
| 6,827,873 B1 * | 12/2004 | Hartley et al. ................. 252/70 |
| 6,843,931 B1 | 1/2005 | Sapienza |

FOREIGN PATENT DOCUMENTS

| | | |
|---|---|---|
| GB | 796633 | 8/1958 |
| RU | 1664808 | 7/1991 |
| WO | 01/07532 A1 | 2/2001 |

OTHER PUBLICATIONS

Derwent Abstract No. 1994-175311, abstract of Soviet Union Patent Specification No. 1803546 A1 (Mar. 23, 1993).*
T.W. Graham Solomons and Craig B. Fryhle, Organic Chemistry 7th edition, pp. 1124-1125, (no date).
Phytic Acid: Chemistry and Applications, Edited by Ernst Graf, Pilatus Press, Minneapolis, MN, 1986, ISBN 0-9614915-0-7, pp. 1-21 and 118-125, (no month).
CRC Handbook of Chemistry and Physics, A Ready-Reference Book of Chemical and Physical Data, David R. Lide, 78th Edition 1997-1998, pp. 8-56, 8-61, 8-62, 8-64, 8-73, 8-74, (no month).
Composition of Corn Steep Water during Steeping, Steven R. Hull, Byung Yun Yang, David Venzke, Kurt Kulhavy and Rex Montgomery, J. Agic. Food Chem. 1996, 44, 1857-1863, (no month).

(Continued)

*Primary Examiner*—Anthony J. Green
(74) *Attorney, Agent, or Firm*—Wall Marjama & Bilinski LLP

(57) ABSTRACT

A deicing formulation which exhibits improved viscosity and stickiness for application to surfaces which includes at least one of BCS, DCS, CSSL or a low molecular weight carbohydrate fraction with a chloride salt, and an effective amount of a lignosulfonate to provide for improved viscosity and stickiness.

24 Claims, No Drawings

OTHER PUBLICATIONS

Brewers Condensed Solubles. I. Composition and Physical Properties, B.R. Sebree, D.S. Chung and P.A. Seib, vol. 60, No. 2, 1983, pp. 147-151, (no month).

Determination of the Carbohydrate Components of the Low Molecular Weight Fraction and Fraction E., Report No. 99-B21E-0050 (Interim No. 8) 4 pages, 2 Appendices, Dated Aug. 30, 1999.

Low-D.E. Corn Starch Hydrolysates, Multi-functional carbohydrates aid in food formulation, Reprinted from Food Technology, vol. 27, No. 3, pp. 38-40, Copyright 1972 by Institute of Food Technologists, Daniel G. Murray and Leslie R. Luft, (no month).

Slip-sliding away, Southbridge Evening News, Southbridge, MA, Feb. 16, 1998, Bruce Uptom.

Public Works Engineering, Construction & Maintenance, Jul. 1997.

Civil Action No. 5:03-CV-0530 (DEP), Decision and Order, Aug. 27, 2004, 125 pages. Sears U.S. Appl. No. 6,299,793 (Case No. 03 CV 530 in the United States District Court, Northern District of New York.

Civil Action No. 5:03-CV-0530 (DEP), Judgment, Apr. 12, 2005, 6 pages.

Common Ice Melter Ingredients, 3 pgs., http://www.vigoro.on.ca/ice/ingred.html, Aug. 30, 1998.

Manual of Practice for an Effective Anti-Icing Program-A Guide for Highway Winter Maintenance Personnel, Prepared for the Federal Highway Administration by US Army Cold Regions Research and Engineering Laboratory Corps of Engineers, Hanover, New Hampshire, Draft Feb. 22, 1996, pp. 1-64.

1 page advertisement titled "Fusion Liquid De-Icer"(Publication date unknown),

* cited by examiner deicing FORMULATION HAVING IMPROVED STICKINESS

This is a continuation-in-part of U.S. Ser. No.: 10/444,559, now U.S. Pat. No. 6,827,873, filed May 23, 2003 (Granted Dec. 7, 2004) which is a continuation of U.S. Ser. No.: 10/260,808, now U.S. Pat. No. 6,582,622, filed Sep. 30, 2002 (Granted Jun. 24, 2003), which is a continuation-in-part of U.S. Ser. No.: 10/212,319, now U.S. Pat. No. 6,596,188, filed Aug. 5, 2002 (Granted Jul. 22, 2003), and a continuation-in-part of U.S. Ser. No.: 10/212,318, now U.S. Pat. No. 6,599,440, filed Aug. 5, 2002 (Granted Jul. 29, 2003), which both are a continuation-in-part of application U.S. Ser. No. 09/971,163 now U.S. Pat. No. 6,440,325 and U.S. Ser. No. 09/971,165 now U.S. Pat. No. 6,436,310 both filed on Oct. 4, 2001 (Granted Aug. 27, 2002 and Aug. 20, 2002, respectively), which are both a continuation-in-part of U.S. Ser. No. 09/755,587, now U.S. Pat. No. 6,299,793, filed Jan. 5, 2001 (Granted Oct. 9, 2001), which is a continuation-in-part application of U.S. Ser. No. 09/224,906 filed on Jan. 4, 1999, now abandoned and U.S. Ser. No.: 60/070,636 filed Jan. 7, 1998, the entirety of each of the above applications which are incorporated herein by reference.

BACKGROUND OF THE INVENTION

The current state of the art for coping with snow and ice on roads usually involves applying a deicer material such as a salt to the road surface. Sometimes antiskid materials such as sand or other aggregates such as gravel are added with or without a salt.

The use of salt and compositions having high concentrations of salt, cause an undesirable corrosive effect on vehicles, the road surface, and the environment with respect to the run off of water containing salt which contaminates the surrounding land and water.

Considering the above problems associated with salt formulations, there has been a continuing need for a deicing composition or formulation which can be easily applied to effectively melt snow and ice yet which reduces the corrosion and environmental contamination referred to above. In response to the above problems associated with the use of road salt, the prior art has looked to alternative formulations which are less corrosive and more environmentally friendly.

U.S. Pat. No. 5,922,240 (Johnson et al.) relates to a deicing composition comprising brewers' condensed solubles produced, for example, as by-products from a commercial beer brewing process, which by-products are biodegradable. The invention also relates to the use of a deicing composition to reduce the buildup of snow and ice on road, bridges and other outdoor surfaces.

U.S. Pat. No. 5,635,101 (Janke et al.) relates to a deicing composition containing a by-product of a wet milling process of shelled corn. Corn kernels are steeped or soaked in a hot solution containing small amounts of sulfurous acid. The corn kernels are separated from the steep water and the corn steepwater solubles are used in the production of a deicing composition.

U.S. Pat. No. 4,676,918 (Toth et al.) relates to a deicing composition which comprises a mixture containing at least one component selected from a number of chlorides or urea and an admixture of waste concentrate of alcohol distilling that has a dry substance content of from 200 to 750 g/kg and from 10% to 80% by weight of water.

U.S. Pat. No. 6,299,793 (Hartley et al.) utilizes a concentration of low molecular weight carbohydrates to produce a synergistic effect on the freezing point and ice/snow melting characteristics of chloride containing liquid deicers.

In some cases, the above described formulations appear to have low viscosities and poor adhering characteristics and when applied to salt and sand piles, the material will run off and not remain in its intended location on and in the salt/sand pile. Formulations exhibiting this problem also exhibited a tendency to run off when applied directly to roadway surfaces.

To improve quality and performance, and to meet current mandated standards, there has been a continuing need for a source of deicing formulations which exhibit improved performance with respect to their use and application and which also exhibit reduced metal corrosion, spalling of concrete, toxicity and address environmental concerns.

It is therefore an object of the present invention to provide a deicing formulation which exhibits improved performance standards which overcome the prior art problems described above.

It is a further object of the present invention to provide a deicing formulation which exhibits an improved viscosity profile.

It is another object of the present invention to provide a deicing formulation which exhibits increased stickiness when applied to salt piles and roadway surfaces and the like.

It is a further object of the present invention to provide a deicing formulation which provides consistent physical and chemical properties, thereby assuring consistent quality and performance.

It is another object of the present invention to provide an economical, highly effective deicing formulation which can be efficiently and effectively applied to salt piles and roadway surfaces and the like.

SUMMARY OF THE INVENTION

The present invention relates to deicer formulations and comprises an aqueous solution containing any one of a number of agricultural residuals and a freezing point depressant such as a chloride salt. Suitable agricultural materials include brewers condensed solubles (BCS), distillers condensed solubles (DCS), and condensed corn steep liquor (CCSL). A preferred formulation utilizes a carbohydrate in a carefully controlled molecular weight range of about 180–1500 (more preferably 180–1000) in place of the agricultural residuals described above. It has been discovered that a preferred viscosity profile and the desired stickiness of these formulations for optimum application in use can be obtained by the addition of small, but critical amount of lignosulfonate. It has been found that lignosulfonate in a range of about 5 to 10% by weight is sufficient to impart the desired degree of stickiness. The improvement in viscosity and stickiness is obtained without changing the deicing properties of these formulations. The addition of the lignosulfonate provides the desired viscosity control and stickiness without the addition of significant amounts of viscosity modifiers such as high molecular weight carbohydrate and cellulose derivatives.

The deicer formulation of the present invention also functions to prevent the cementing together of sand, sand/salt, salt, aggregates, aggregates/salt etc when stored in piles. Ice crystals act as cement/adhesive and cause the formation of large masses of very hard, rock like substances. It becomes very difficult to break down these masses into a small size so that the normal application onto roads can be achieved. These problems are largely overcome by spraying the salt pile with the liquid deicer in an amount sufficient to form a liquid coating of the surface of the salt particles.

DETAILED DESCRIPTION OF THE INVENTION

Lignosulfonate is a metallic sulfonate salt made from the lignin of sulfite pulp-mill liquors, having a molecular weight range of about 1000–20,000.

In the present invention the lignosulfonate may be in the form of ammonium lignosulfonate, sodium lignosulfontate, and the mixed salt sodium/ammonium lignosulfonate.

In the development of the present invention, four fully formulated deicer solutions were investigated. Three formulations included various corn syrups while the fourth included distillers condensed solubles (DCS). The formulations appeared to have low viscosities and poor adhering characteristics and when applied to salt and sand piles, the material will run off and not remain in its intended location on and in the salt/sand pile. The objective was to evaluate the use of a number of additives to one of the formulations (DCS) to thicken the solution and lessen run off without changing the deicing properties of the formulations.

Known weights of the selected powdered or liquid thickeners were added to 10 ml samples of the DCS formulation. The solutions were mixed using a vortex mixer to fully dissolve the materials. The mixing in most cases caused the formation of foam that required 24 hours in some cases to dissipate.

The samples were evaluated at room temperature for signs of an increase in thickness by inverting the tubes and observing the time required for the liquid coating to run off the walls of the container. When increased thickness was suspected, the solution was again evaluated by comparing the time required for the treated liquid to run off a microscope slide dipped in the solution to the time required for the same untreated solution to run off a dipped microscope slide. Some test solutions were placed at 5 and −20° C. to further evaluate increases in thickness as temperature decreases.

In addition, stickiness and slipperiness was assessed by dipping a microscope slide in the treated test solution and touching the wet area with a gloved finger and pulling away slowly. Stickiness was observed by looking for a film of the liquid to pull away from the slide and the glove, and then break. Slipperiness was checked when gel globules were present in the test solutions by holding the wet microscope slide between the thumb and fore finger and rubbing them back and forth and comparing the result with the original formulation without added thickener.

The following six additives were tested with two Spanish DCS and one BCS compositions under the conditions outlined above and in various concentrations and with the results set forth below.

Xanthan Gum. ADM Industrial Dispersible Xanthan Gum, product code 174960 lot 02XG127 was added to the three test solutions at concentrations of 0.2, 0.4 and 1.0% by weight, respectively. Initially the material floats on the surface of the solution and requires vigorous mixing using a vortex mixer to dissolve the material. Mixing causes the formation of significant amounts of foam that requires 24 hours to disperse before the effect of the gum addition can be evaluated. The addition of the gum did increase the viscosity of the solutions however gelatinous globules formed that did not dissolve. The gel globules would randomly deposit on the surface while the remainder of the liquid would run off. The gel on the surface increased the surface slipperiness without increasing wither the viscosity or the stickiness.

Maltodextrin and Corn Syrups. ADM Maltodextrin Clintose CR5 Lot M02070140, CR10 lot M02071260, Clintose CR24 corn syrup solids lot M01121320 and CASCO product 01400 corn syrup solids were each separately added to the three test solutions at concentrations of 0.5, 1, 5 and 10% by weight, respectively. All of the materials dissolved without problems, however the initial foam prevented assessment for 24 hours after addition. No visible increase in viscosity or stickiness was observed at room temperature when compared to the original formulations. All solutions showed an increase in both viscosity and stickiness at 5 and −20° C. when compared to room temperature.

Ammonium Lignosulfonate Liquid. The Ammonium Lignosulfonate liquid was added to the test solutions at concentrations of 0.5, 1, 5, and 10% by weight, respectively. The material dissolved in the test solutions without problems, however the vortex mixing caused the formation of significant foam. Once the initial foam dissipated shaking the solutions did not cause excessive foam formation. All test samples with both the 5 and 10% addition of ammonium lignosulfonate at room temperature showed a visible increase in both viscosity and stickiness. The viscosity and stickiness increased as the temperature decreases. At 5 and −20° C. good surface coatings were observed.

The table below list a grouping of suitable lignosulfonates which may be used in the deicer formulations of the present invention.

TABLE 1

| Source Tembec Inc. Reference No. | Type of lignosulfonate | Total Solids (%) | Viscosity (cps) at 25° C. (77° F.) |
|---|---|---|---|
| A02 | Ammonium | 47.0 | 200 to 1200 |
| S01 | Sodium | 46.0 | Less than 1000 |
| S05 | Sodium | 48.5 | Less than 400 |
| S07 | Sodium | 48.5 | Less than 300 |
| SA02 | Sodium/Ammonium | 48.0 | Less than 700 |

The following four deicer solutions (Examples 1–4) were tested as outlined above, and the results tabulated below. For Examples 1–3 stickiness was tested at 68° F. and −4° F. with no additive component.

EXAMPLE 1

Corn Syrup 42/43 DE solids 16.14% parts by weight.

Magnesium chloride solids (anhydrous) 21.42% parts by weight.

Water 62.44% parts by weight.

Stickiness Rating at 20° C. (68° F.) Poor.

Stickiness Rating at −20° C. (−4° F.) Good.

EXAMPLE 2

High Fructose Corn Syrup 42 DE Solids 14.20% parts by weight.

Magnesium chloride solids (anhydrous) 21.42 parts by weight.

Water 64.38% parts by weight.

Stickiness Rating at 20° C. (68° F.) Poor

Stickiness Rating at −20° C. (−4° F.) Good

EXAMPLE 3

Corn Syrup 42 DE Solids 7.32% parts by weight.

Magnesium chloride (anhydrous) 26.87% parts by weight.

Water 65.81% parts by weight.

Stickiness Rating at 20° C. (68° F.) Poor.

Stickiness Rating at −20° C. (−4° F.) Poor to Fair.

EXAMPLE 4

This is the basic formulation for the testing of various additives.

Distillers Condensed Solubles Solids 22.50% parts by weight.

Magnesium Chloride (anhydrous) 15.30% parts by weight.

Water 62.20% parts by weight.

Stickiness Rating Results

As set forth in Table II, various additives were added to Example 4 and the Stickiness Ratings determined at different additive concentrations and temperatures.

TABLE II

| Additive | % Additive by weight | Stickiness Rating 20° C./68° F. | 5° C./41° F. | −20° C./−4° F. |
|---|---|---|---|---|
| Control: No additive | Nil | Poor | Poor | Poor |
| Xanthan Gum | 0.2 | Poor | Poor | Poor |
|  | 0.4 | Poor | Poor | Poor |
|  | 1.0 | Poor | Poor | Poor |
| Maltodextrin CR5 (ADM) | 0.5 | Poor | Fair | Fair |
|  | 1.5 | Poor | Fair | Fair |
|  | 5.0 | Poor | Fair | Fair |
|  | 10.0 | Poor | Fair | Fair |
| Maltodextrin CR10 (ADM) | 0.5 | Poor | Fair | Fair |
|  | 1.0 | Poor | Fair | Fair |
|  | 5.0 | Poor | Fair | Fair |
|  | 10.0 | Poor | Fair | Fair |
| Corn Syrup CR24 (ADM) | 0.5 | Poor | Fair | Fair |
|  | 1.0 | Poor | Fair | Fair |
|  | 5.0 | Poor | Fair | Fair |
|  | 10.0 | Poor | Fair | Fair |
| Corn Syrup 01400 (Casco) | 0.5 | Poor | Fair | Fair |
|  | 1.0 | Poor | Fair | Fair |
|  | 5.0 | Poor | Fair | Fair |
|  | 10.0 | Poor | Fair | Fair |
| Ammonium Lignosulfonate Solution (Tembec) | 0.5 | Fair | Fair | Fair |
|  | 1.0 | Fair | Fair | Fair |
|  | 5.0 | Good | Very Good | Very Good |
|  | 10.0 | Good | Very Good | Very Good |

The ammonium lignosulfonate liquid was analyzed for selected metals and the results are presented in Table III. The phosphorus concentration is low (68, 71 ppm) and the other metals are in small concentrations which would be acceptable in meeting deicer solution specifications.

TABLE III

| Metal | Mg/mL (ppm) |
|---|---|
| Aluminum | 9, 9 |
| Boron | 2, 2 |
| Beryllium | <0.02, <0.02 |
| Calcium | 796, 812 |
| Cadmium | <0.2, <02 |
| Cobalt | <0.1, <0.1 |
| Chromium | <0.4, <0.4 |
| Copper | <0.5, <0.5 |
| Iron | 11, 12 |
| Phosphorus | 68, 71 |
| Potassium | 601, 564 |
| Magnesium | 146, 150 |
| Manganese | 49, 50 |
| Molybdenum | <0.5, <0.5 |
| Sodium | 886, 907 |
| Nickel | <0.2, <0.3 |
| Lead | <0.7, <0.7 |
| Silicon | 14, 5 |
| Titanium | <0.1, <0.1 |
| Vanadium | <0.2, <0.2 |
| Zinc | 6, 6 |

From the above testing it was discovered that the addition of between about 5 and 10% Ammonium Lignosulfonate liquid provides the required visible increase in viscosity and stickiness at room temperature without adding any significant metals or phosphorus. The material also meets the cost requirements at the concentrations added and provides a solution to the thickening problem.

The Xanthan Gum thickeners show a visible increase in viscosity and stickiness but are considered unsuitable because of the formation of the gel globules that result in an undesirable increase in slipperiness.

The Maltodextrin and corn Syrup Solids did not visibly increase the viscosity or stickiness at 10% and concentration greater than that are not considered cost effective.

With respect to foaming, xanthan gum exhibited serious foaming problems followed by maltodextrin and corn syrup, with the least foaming problems associated with the ammonium lignosulfonate.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A deicing formulation which comprises:
    (a) at least one material selected from the group consisting of brewers condensed solubles, distillers condensed solubles and condensed corn steep liquor in a concentration of about 3 to 60 wt %;
    (b) a chloride salt in a concentration of about 5 to 35 wt %;
    (c) a lignosulfonate in an amount sufficient to increase viscosity and stickiness; and
    (d) water balance.

2. The formulation of claim 1 in which the lignosulfonate is present in a concentration of about 5–10 wt %.

3. The formulation of claim 1 in which the lignosulfonate is selected from the group consisting of ammonium lignosulfonate, sodium lignosulfonate and the mixed salt sodium/ammonium lignosulfonate.

4. The formulation of claim 1 in which the chloride salt is $MgCl_2$.

5. An aqueous deicing formulation which comprises:

| Constituent | Weight % |
| --- | --- |
| carbohydrate having a molecular weight in the range of about 180–1500 | 3–60 |
| chloride salt | 3–35 |
| lignosulfonate | in an amount sufficient to increase viscosity and stickiness |
| Water | balance. |

6. The formulation of claim 5 in which the lignosulfonate is present in a concentration of about 5–10 wt %.

7. The formulation of claim 5 in which the lignosulfonate is selected from the group consisting of ammonium lignosulfonate, sodium lignosulfonate and the mixed salt sodium/ammonium lignosulfonate.

8. The formulation of claim 5 in which the chloride salt is $MgCl_2$.

9. A deicing formulation which comprises an aqueous solution which includes the following constituents:

| | Weight % |
| --- | --- |
| Carbohydrate | 3–60 |
| Chloride Salt | 5–35 |
| Lignosulfonate | 5–10 |
| Water | Balance | and where said carbohydrate has a molecular weight in the range of about 180 to 1500.

10. The formulation of claim 9 in which the lignosulfonate is selected from the group consisting of ammonium lignosulfonate, sodium lignosulfonate and the mixed salt sodium/ammonium lignosulfonate.

11. The formulation of claim 9 in which the chloride salt is at least one selected from the group consisting of sodium chloride, magnesium chloride and calcium chloride.

12. The formulation of claim 9 in which the chloride salt is magnesium chloride.

13. A deicing formulation which comprises an aqueous solution which includes the following constituents:

| | Weight % |
| --- | --- |
| brewers condensed solubles | 3–60 |
| Chloride Salt | 5–35 |
| Lignosulfonate | 5–10 |
| Water | Balance. |

14. The formulation of claim 13 in which the lignosulfonate is selected from the group consisting of ammonium lignosulfonate, sodium lignosulfonate and the mixed salt sodium/ammonium lignosulfonate.

15. The formulation of claim 13 in which the chloride salt is at least one selected from the group consisting of sodium chloride, magnesium chloride and calcium chloride.

16. The formulation of claim 13 in which the chloride salt is magnesium chloride.

17. A deicing formulation which comprises an aqueous solution which includes the following constituents:

| | Weight % |
| --- | --- |
| distillers condensed solubles | 3–60 |
| Chloride Salt | 5–35 |
| Lignosulfonate | 5–10 |
| Water | Balance. |

18. The formulation of claim 17 in which the lignosulfonate is selected from the group consisting of ammonium lignosulfonate, sodium lignosulfonate and the mixed salt sodium/ammonium lignosulfonate.

19. The formulation of claim 17 in which the chloride salt is at least one selected from the group consisting of sodium chloride, magnesium chloride and calcium chloride.

20. The formulation of claim 17 in which the chloride salt is magnesium chloride.

21. A deicing formulation which comprises an aqueous solution which includes the following constituents:

| | Weight % |
| --- | --- |
| condensed corn steep liquor | 3–60 |
| Chloride Salt | 5–35 |
| Lignosulfonate | 5–10 |
| Water | Balance. |

22. The formulation of claim 21 in which the lignosulfonate is selected from the group consisting of ammonium lignosulfonate, sodium lignosulfonate and the mixed salt sodium/ammonium lignosulfonate.

23. The formulation of claim 21 in which the chloride salt is at least one selected from the group consisting of sodium chloride, magnesium chloride and calcium chloride.

24. The formulation of claim 21 in which the chloride salt is magnesium chloride.

* * * * *